United States Patent
Frain et al.

(10) Patent No.: US 8,086,512 B2
(45) Date of Patent: Dec. 27, 2011

(54) SYSTEM AND METHOD FOR SCHEDULING ASSET ALLOCATION

(75) Inventors: Jason Scott Frain, East Granby, CT (US); Diane Toby Gallo, Cheshire, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 387 days.

(21) Appl. No.: 11/959,933

(22) Filed: Dec. 19, 2007

(65) Prior Publication Data

US 2009/0164385 A1 Jun. 25, 2009

(51) Int. Cl.
*G06F 17/60* (2006.01)
(52) U.S. Cl. ......................................... 705/36
(58) Field of Classification Search ..................... 705/36
See application file for complete search history.

(56) References Cited

U.S. PATENT DOCUMENTS

| | | | |
|---|---|---|---|
| 5,126,936 A | 6/1992 | Champion et al. | |
| 5,812,987 A | 9/1998 | Luskin et al. | |
| 5,819,263 A | 10/1998 | Bromley et al. | |
| 5,987,433 A | 11/1999 | Crapo | |
| 6,018,722 A | 1/2000 | Ray et al. | |
| 6,430,542 B1 | 8/2002 | Moran | |
| 6,535,855 B1 | 3/2003 | Cahill et al. | |
| 6,801,199 B1 | 10/2004 | Wallman | |
| 6,859,788 B1 | 2/2005 | Davey | |
| 7,050,998 B1 | 5/2006 | Kale et al. | |
| 7,062,458 B2 | 6/2006 | Maggioncalda et al. | |
| 7,149,713 B2 | 12/2006 | Bove et al. | |
| 7,197,484 B1 | 3/2007 | Yuyama | |
| 7,216,099 B2 | 5/2007 | Chen et al. | |
| 7,249,080 B1 | 7/2007 | Hoffman et al. | |
| 2002/0174045 A1* | 11/2002 | Arena et al. | 705/36 |
| 2003/0172018 A1 | 9/2003 | Chen et al. | |
| 2005/0010516 A1 | 1/2005 | Ivanov et al. | |
| 2005/0154662 A1 | 7/2005 | Langenwalter | |
| 2007/0255638 A1 | 11/2007 | Chen et al. | |

OTHER PUBLICATIONS

FinaMetrica Risk Profiling System.
The Risk Profile Problem for Stock Portfolio Optimization.
IPERS Asset Allocator Software.
SEC Beginner's Guide to Asset Allocation, Diversification, and Rebalancing.
Profiling Private Clients for value-added Wealth Managment.
Prudential GoalMaker (R).
International Search Report and Written Opinion from corresponding International Application No. PCT/US2008/012069 dated Apr. 28, 2009 (7 pages).

* cited by examiner

*Primary Examiner* — Chrales R. Kyle
*Assistant Examiner* — Siegfried E. Chencinski
(74) *Attorney, Agent, or Firm* — Howard IP Law Group, PC

(57) ABSTRACT

A distributed asset allocation processing system performs a computerized method for allocating subscriber assets. The system configures predetermined investment allocation paths that relate asset allocation models to trigger events. The system then selects a predetermined path based on a subscriber's risk tolerance. At each trigger event along the predetermined path, the system automatically rebalances the subscriber's assets according to an asset allocation model corresponding to the trigger event.

44 Claims, 7 Drawing Sheets

| Risk Tolerance | Subscriber Age /Asset Allocation Models/ Predetermined Paths | <31 | 31-40 | 41-50 | 51-60 | 61-65 | >65 |
|---|---|---|---|---|---|---|---|
| Low (Conservative, risk-averse) | 44a | 48c | 48c | 48d | 48d | 48e | 48e |
| | 44b | 48c | 48c | 48c | 48d | 48e | 48e |
| | 44c | 48c | 48c | 48c | 48c | 48d | 48e |
| Moderate | 44d | 48b | 48c | 48c | 48c | 48c | 48e |
| | 44e | 48b | 48b | 48b | 48c | 48d | 48e |
| | 44f | 48b | 48b | 48b | 48c | 48d | 48e |
| High (Aggressive, risk-neutral) | 44g | 48a | 48b | 48b | 48b | 48c | 48d |
| | 44j | 48a | 48b | 48b | 48c | 48d | 48d |
| | 44i | 48a | 48b | 48b | 48c | 48d | 48d |

FIG. 4

SYSTEM AND METHOD FOR SCHEDULING ASSET ALLOCATION

FIELD OF THE INVENTION

The present invention relates to a system and method for automatically distributing assets and, more particularly, to automatically rebalancing assets in accordance with a predetermined investment allocation path.

BACKGROUND OF THE INVENTION

Investors increasingly seek effective management of their financial assets. In response to this growing demand for asset management, various methods have been proposed for developing and implementing asset allocation.

Many assets are invested according to various AAMs, or asset allocation models. An asset allocation model is the term commonly used in the art of financial management to describe diversification of a subscriber's assets among a portfolio of investment options with varying rates of return and risks of loss. Typically, asset allocation models are designed to correlate to a subscriber's risk tolerance.

Asset allocation models are used in retirement plans for investing a subscriber's assets. As the subscriber progresses toward retirement, it typically is desirable to adjust the asset allocation model so as to reduce the exposure of accumulated assets to the risk of loss. However, it is well known that subscribers typically fail to shift their asset allocation models with appropriate periodicity. In fact, many subscribers fail to shift their asset allocation models at all. Thus, large quantities of subscriber assets are not optimally managed, resulting in financial losses to individual subscribers.

Accordingly, there is a need for improved systems and methods of automated financial asset management.

BRIEF SUMMARY OF THE INVENTION

According to the present invention, a distributed asset allocation processing system includes a data storage device for storing data indicative of a subscriber risk tolerance, data indicative of a plurality of predetermined investment allocation paths, data indicative of a plurality of trigger events, and data indicative of a plurality of asset allocation models corresponding to each of the trigger events along the predetermined investment allocation paths. The distributed asset allocation processing system also includes a server coupled to the data storage device to retrieve the subscriber risk tolerance and to select a predetermined investment allocation path based on the subscriber risk tolerance, wherein the server allows the subscriber to switch between the plurality of predetermined investment allocation paths at a branch point.

According to an embodiment of the present invention, the server performs a computerized method for allocating a subscriber's assets. The server first configures data indicative of a plurality of predetermined investment allocation paths. Each path has data indicative of a plurality of asset allocation models having varied investment profiles. The path is based on a series of several trigger events, and each asset allocation model along the path corresponds to a trigger event. The server then receives and stores data indicative of an initial risk tolerance associated with the subscriber. Based on the initial risk tolerance, the server selects an appropriate predetermined path. At each trigger event along the predetermined path, the server then directs investment of the subscriber's assets according to the corresponding asset allocation model.

According to a feature of the present invention, before each trigger event, the server directs delivery to the subscriber of a notification describing the trigger event, the corresponding asset allocation model, and the predetermined path. The notification also explains various responses that the subscriber may make. The subscriber may direct the server to continue investing the subscriber's assets according to the predetermined path. Alternatively, the subscriber may direct the server to switch the subscriber's assets to an alternate predetermined path.

According to another feature of the present invention, the server also may schedule pre-scheduled transactions based on instructions provided by the subscriber. The pre-scheduled transactions may include increases or decreases of the subscriber's investment contributions, or other financial transactions such as asset transfers.

By investing assets according to the predetermined path, the subscriber may attain a reasonable likelihood of success in his or her goal of accumulating sufficient assets to fund retirement expenses. According to the present invention, the subscriber knows at the outset the details of the path to retirement, and those details are in accord with the subscriber's initial risk tolerance as well as future values of the subscriber's risk tolerance extrapolated from the initial risk tolerance as a function of the subscriber's future age.

These and other objects, features and advantages of the present invention will become apparent in light of the detailed description of the best mode embodiment thereof, as illustrated in the accompanying drawings.

BRIEF DESCRIPTION OF THE DRAWINGS

FIG. 4 is a table of a plurality of predetermined paths and a plurality of trigger events, as configured by the computerized method of FIG. 3 in accordance with an embodiment of the present invention;

DETAILED DESCRIPTION OF THE PREFERRED EMBODIMENTS

Figure 1:
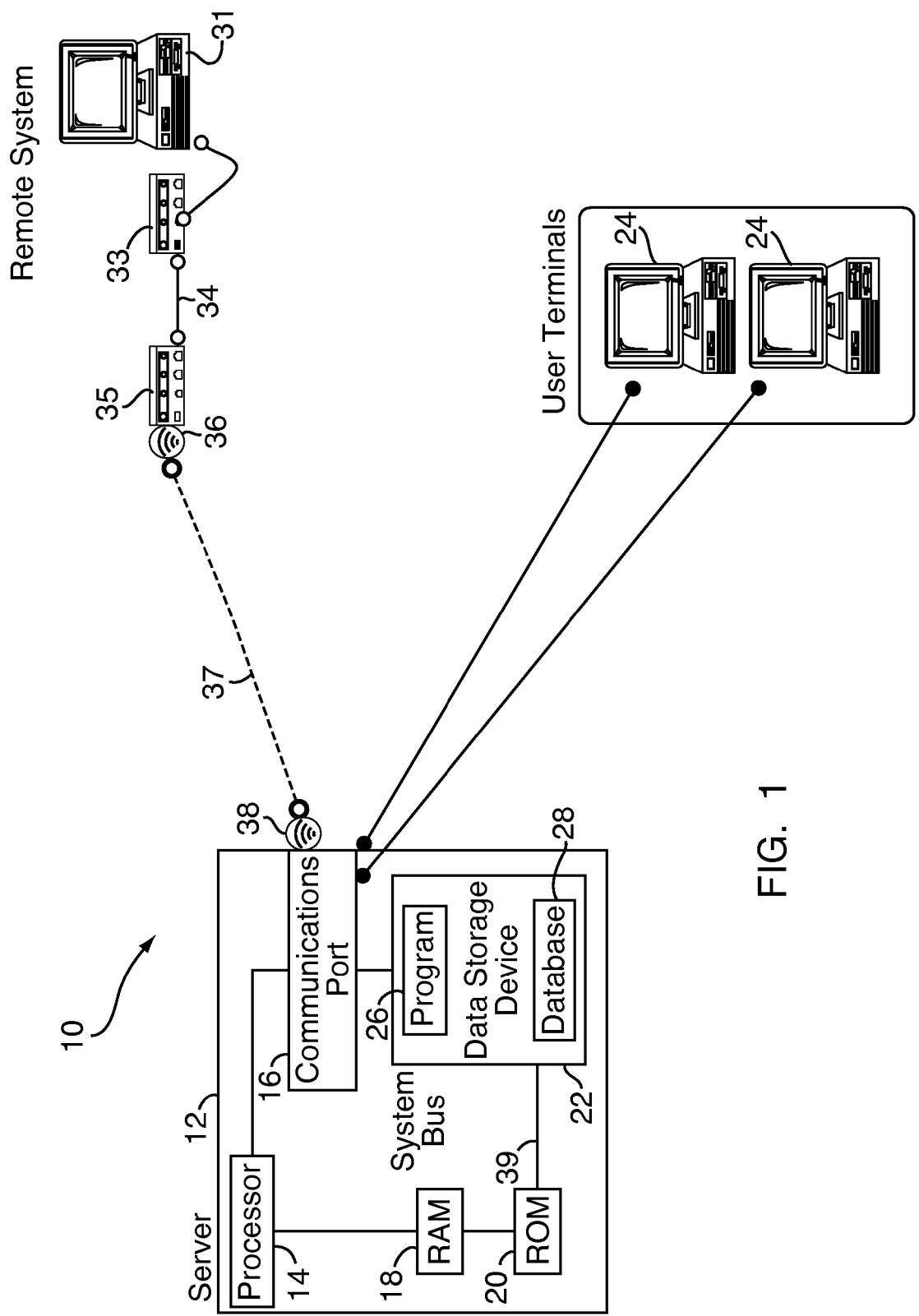
FIG. 1 is a schematic diagram of a distributed asset allocation processing system in accordance with an embodiment of the present invention.

Referring to FIG. 1, the present invention relates to a distributed asset allocation processing system 10, which includes at least one central processing computer or computer network server 12. Computer network server 12 includes at least one controller or central processing unit (CPU) 14, at least one communication port 16, at least one random access memory (RAM) 18, at least one read only memory (ROM) 20 and one or more data storage devices 22. All of these later elements are in communication with the CPU 14 to facilitate the operation of the network server 12. The network server 12 may be configured in many different ways. For example, network server 12 may be a conventional standalone server computer, as shown in FIG. 1, or the function of server 12 may be distributed across multiple computing systems and architectures, as shown in FIG. 2.

Figure 2:
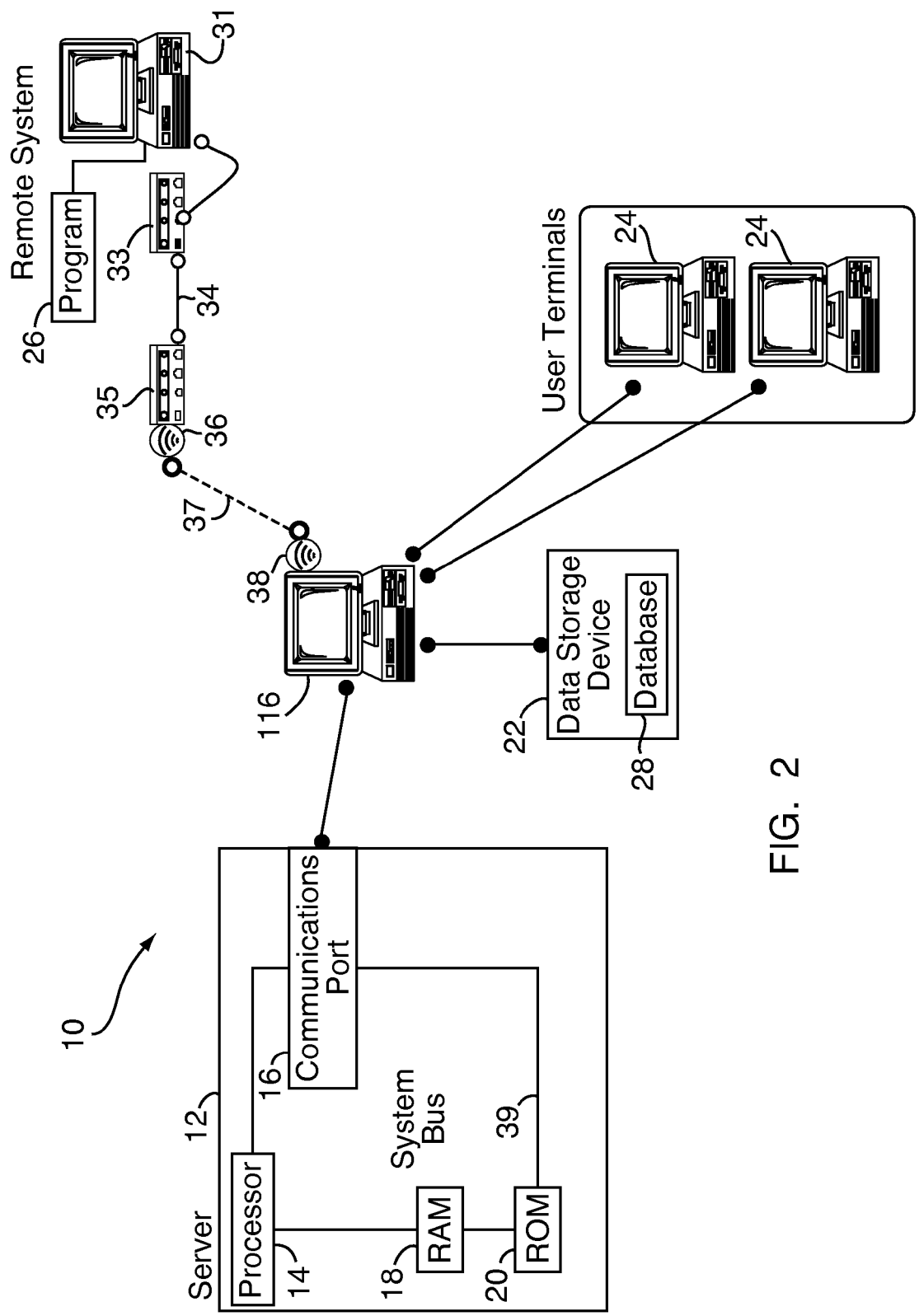
FIG. 2 is a schematic diagram of the distributed asset allocation processing system in accordance with an alternate embodiment of the present invention.

Referring to FIG. 2, wherein like reference numbers refer to like components from FIG. 1, network server 12 may also be configured in a distributed architecture 110, wherein data storage devices 22 and processors 14 are housed in separate units or locations. Some such servers perform primary processing functions and contain, at a minimum, a random access memory (RAM) 18, a read only memory (ROM) 20, and a general controller or processor 14. In such an embodiment, each of these servers 12 is attached to a communications hub or port 116 that serves as a primary communication link with other servers, client or user computers 24 and other related devices. The communications hub or port 116 may have minimal processing capability itself, serving primarily as a communications router. A variety of communications protocols may be part of the system, including but not limited to: Ethernet, SAP, SAS.TM., ATP, Bluetooth, and TCP/IP.

Figure 3:
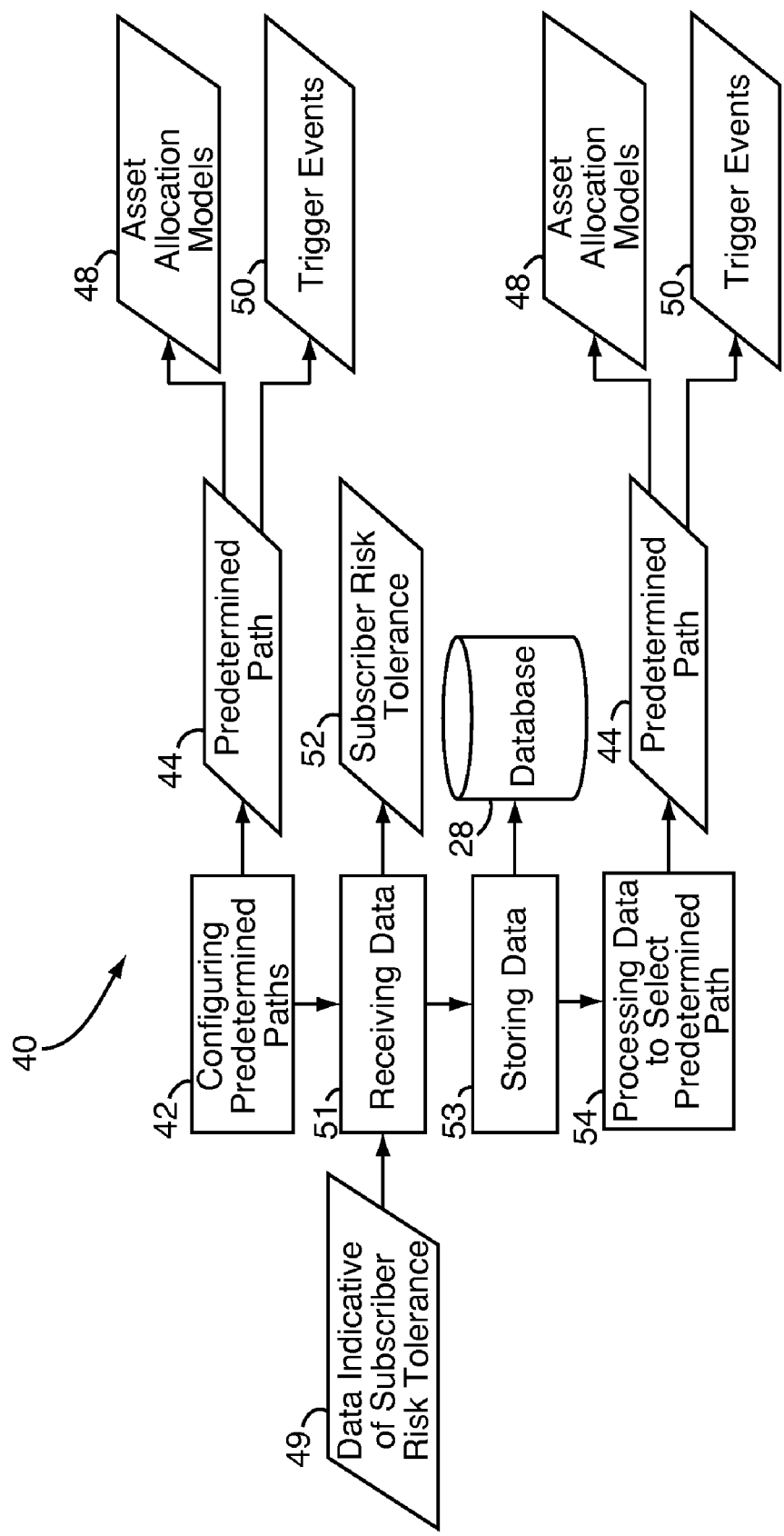
FIG. 3 is a flow chart of a computerized method for allocating a subscriber's assets, as performed by the system of FIG. 1 or FIG. 2 in accordance with an embodiment of the present invention.

The server 12 is configured to perform a computerized method 40 for allocating financial assets related to a subscriber, as shown in FIG. 3. Referring back to FIG. 1, the network server 12 comprises a processor 14, such as one or more conventional microprocessors and one or more supplementary co-processors such as math co-processors. In performing the computerized method 40, the processor 14 will need to communicate with external devices such as other servers, user terminals 24, or other devices. Accordingly, the processor 14 is in communication with the communication port 16. Communication port 16 may include multiple communication channels for simultaneous communication with, for example, other processors, servers or client terminals 24. Devices in communication with each other need not be continually transmitting to each other. On the contrary, such devices need only transmit to each other as necessary, may actually refrain from exchanging data most of the time, and may require several steps to be performed to establish a communication link between the devices. For example, the communication port 16 may include wire modems, wireless radio, infrared, visible laser, or UV laser transceivers, or audio transceivers.

The processor 14 also is in communication with a data storage device 22. The data storage device 22 may comprise an appropriate combination of magnetic, optical and /or semiconductor or flash memory, and may include, for example, RAM, ROM, an optical disc such as a compact disc and /or a hard disk or drive. The processor 14 and the data storage device 22 each may be, for example, located entirely within a single computer or other computing device; or connected to each other by a communication medium, such as a USB port, serial port cable, a coaxial cable, a Ethernet type cable, a telephone line, a radio frequency transceiver or other similar wireless or wireline medium.

The data storage device 22 of the system 10 may be configured to store, for example, (i) a program and/or algorithm(s) 26 (e.g., computer program code and/or a computer program product) adapted to configure the processor 14 of server 12 to perform the computerized method 40 for allocating financial assets related to a subscriber, as described in detail hereinafter; (ii) at least one database 28 configured to store information required, manipulated, or produced by the processor 14 of the server 12 according to the computerized method 40 of the program 26. The database 28 may include multiple records, each record including fields specific to the present invention such as subscriber identities, subscriber risk tolerances, predetermined investment allocation paths, asset allocation models, trigger events, as will be discussed below.

The program 26 may be stored, for example, in a compressed, an uncompiled and/or an encrypted format, and may include computer program code. The instructions of the program may be read into the RAM 18 of the processor 14 from the data storage device 22. While execution of sequences of instructions in the program 26 will cause the processor to perform the steps of the computerized method 40 as described below, hard-wired circuitry may be used in place of, or in combination with, software instructions for implementation of the computerized method 40. Thus, embodiments of the present invention are not limited to any specific combination of hardware and software.

Suitable computer program code may be provided for performing numerous other functions such as notifying the client at selected intervals. The computer program code required to implement the above functions (and the other functions described herein) can be developed by a person of ordinary skill in the art, and is not described in detail herein.

Alternatively, as shown in FIG. 2, the program 26 may be embodied in another computer-readable medium that provides or participates in providing instructions to the processor 14 of the server 12 (or any other processor of a computing device described herein) for execution. The computer-readable medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Transmission media include coaxial cables, copper wire and fiber optics, including the wires that comprise a system bus coupled to the processor. Transmission media may carry acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of the computer-readable medium may be involved in configuring the processor 14 (or any other processor of a device described herein) to perform the computerized method 40. For example, as shown in FIG. 2, the instructions may initially be borne on a magnetic disk of a remote computer 31. The remote computer 31 can load the instructions into its dynamic memory and send the instructions over a telephone line 34 using a first modem 33. A second modem 35 local to a computing device (e.g., the server 12) can receive the data on the telephone line 34 and use an infrared transmitter 36 to convert the data to a wireless signal 37. An infrared detector 38 can receive the data carried in the wireless signal 37 and place the data on a system bus 39 for the processor 14. The system bus 39 carries the data to RAM 18, from which the processor 14 retrieves and executes the instructions. The instructions received by RAM 18 may optionally be stored in memory either before or after execution by the processor 14. In addition, instructions may be received via the communication port 16 as electrical, electromagnetic or optical signals, which are exemplary forms of wireless carrier waves that carry data streams representing various types of information.

The user device or computer 24 may include any one or a combination of a keyboard, a computer display, a touch screen, LCD, voice recognition software, an optical or magnetic read head, or other input/output devices required to implement the above functionality. The program 26 also may include program elements such as an operating system, a database management system and "device drivers" that allow the processor to interface with computer peripheral devices (e.g., a video display, a keyboard, a computer mouse).

Referring to FIG. 3, the server 12 of the system 10 is configured to perform the computerized method 40 for allocating financial assets related to a subscriber, for example, a retirement plan subscriber. The computerized method 40 includes a step 42 of configuring data indicative of a plurality of predetermined investment allocation paths 44 in the processor 14 of the server 12, as shown in FIGS. 1-3.

Figure 5:
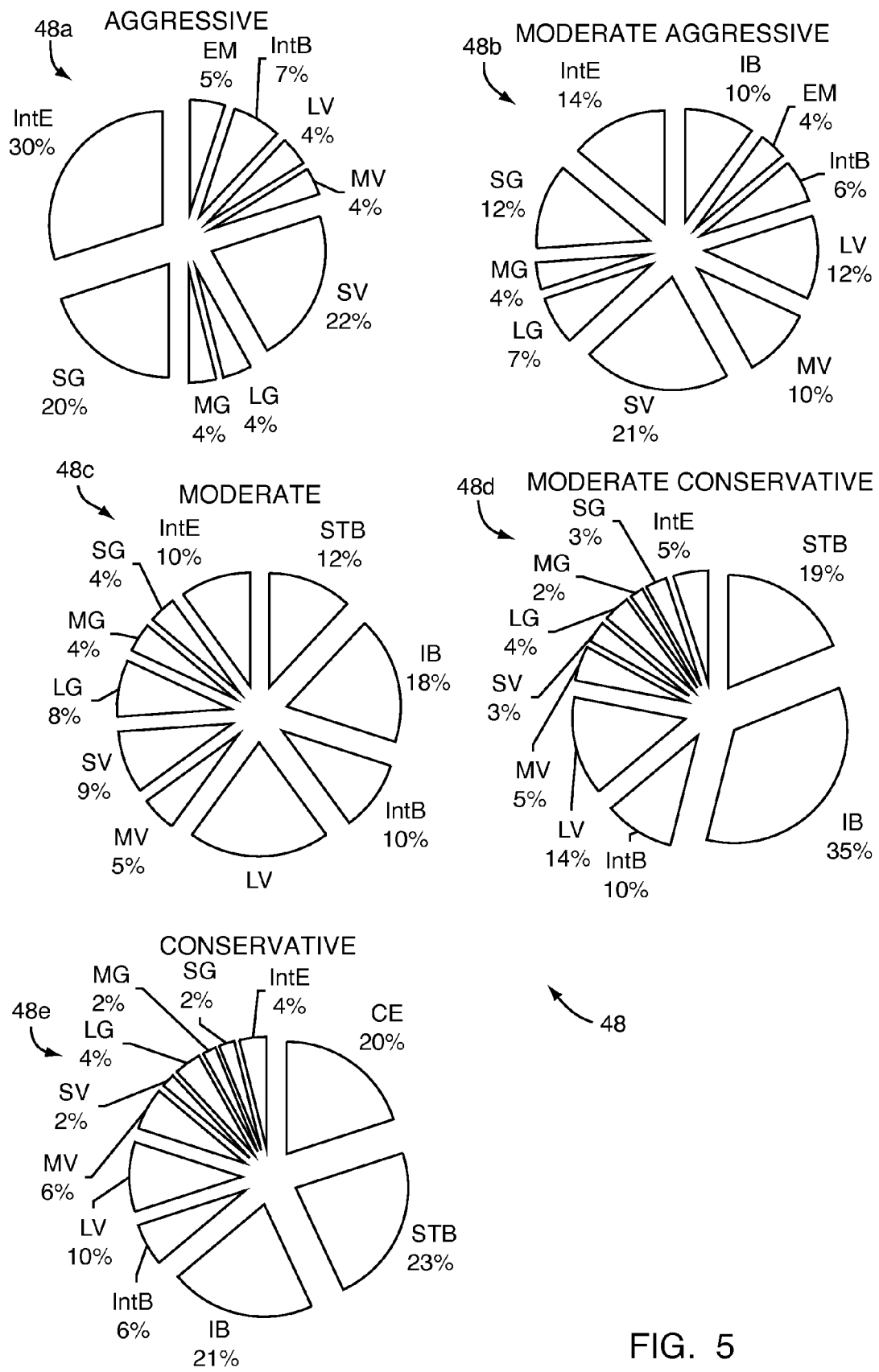
FIG. 5 is a plurality of pie charts illustrating a plurality of asset allocation models, corresponding to the predetermined paths and the trigger events of FIG. 4 in accordance with an embodiment of the present invention.

Referring to FIG. 4, each of the plurality of predetermined investment allocation paths 44a-44i includes a plurality of asset allocation models 48a-48e. Each asset allocation model corresponds to one of a plurality of trigger events 50a-50e along each of the predetermined paths 44a-44i. Each asset allocation model 48 has a varied investment profile, as shown in FIG. 5. Once a predetermined investment allocation path 44 has been selected for the subscriber's assets, as discussed below, the subscriber's assets will be automatically rebalanced from one asset allocation model to another asset allocation model in accordance with the predetermined investment allocation path 44 at the corresponding trigger event 50.

As shown in FIG. 5, the plurality of asset allocation models may include five (5) distinct asset allocation models 48a to 48e, each having a varied investment profile that corresponds to a particular level of investment risk. Although an exemplary number of asset allocation models is shown and described, the scope of the present invention is not limited to any particular number of asset allocation models. The investment profiles include a varied distribution of assets among foreign equities, foreign or domestic bonds, large, medium, or small domestic growth or value equities, or cash equivalents, depending on the subscriber's investment risk tolerance. Methods for establishing investment profiles are well known in the art.

The predetermined investment allocation paths 44a-44i, the plurality of asset allocation models 48a-48e, and the plurality of trigger events 50a-50e may be stored by the server 12 in the database 28 on the data storage device 22, as shown in FIGS. 1 and 3. The server 12 may also be configured to retrieve from the database 28 the predetermined investment allocation paths 44a-44i, the asset allocation models 48a-48e, and the trigger events 50a-50e.

Referring back to FIG. 3, the computerized method 40 also includes a step 51 of receiving, at the server 12, data 49 indicative of a risk tolerance 52 associated with the subscriber. Such data may include, but is not limited to, any of the following: the subscriber's age, financial assets, earning capacity, educational level, attitudinal questionnaire responses, fixed or discretionary expenses, savings rate, or financial goals. Persons of skill in the art know various methods for determining the risk tolerance 52 based on the data 49. In a preferred embodiment, each of the predetermined investment allocation paths 44a-44i is configured based on the initial value of the risk tolerance 52 and by extrapolating future values of the risk tolerance 52 as a function of the subscriber's age corresponding to each of the plurality of trigger events 50a-50e.

As shown in FIG. 4, the trigger events 50 may correspond to the subscriber's birthdays. For example, a trigger event 50a may correspond to the subscriber's 31st birthday; a trigger event 50c may correspond to the subscriber's 51st birthday; and a trigger event 50e may correspond to the subscriber's 66th birthday. The plurality of trigger events 50 alternatively may be based on subscriber life events such as retirement, or education-related expenses such as college attendance by the subscriber's children. The plurality of trigger events 50 also may be based on financial events such as home purchase or sale, completion of mortgage or other loan payments, and other major expenses or changes in cash flow. In an embodiment of the present invention, the server 12 may receive a list of custom trigger events based on the subscriber's individual financial needs and strategy. For example, the subscriber may design their custom trigger events based on a combination of birthdays, educational events, and planned financial events.

The computerized method 40 further includes a step 53 of storing the data 49 in the database 28 of the data storage device 22, which is in communication with the server 12, as shown in FIGS. 1-3.

As shown in FIG. 3, the computerized method 40 also includes a step 54 of processing the data 49 or the risk tolerance 52 in the server 12 to select, from the plurality of predetermined investment allocation paths 44, a predetermined path for the subscriber's assets.

As shown in FIG. 4, the plurality of predetermined investment allocation paths 44 may include nine (9) distinct predetermined investment allocation paths 44a through 44i. Although an exemplary number of predetermined investment allocation paths is shown and described, the scope of the present invention is not limited to any particular number of predetermined investment allocation paths. As an example, for data 49 indicating a low value of risk tolerance 52 related to a first subscriber, predetermined path 44a would be selected for the first subscriber's assets. Predetermined path 44a indicates a progression of relatively conservative or risk-averse asset allocation models corresponding to each of the plurality of trigger events 50. At the trigger event 50a corresponding to the first subscriber's 31st birthday, the predetermined path 44a indicates the asset allocation model 48c.

As shown in FIG. 5, the asset allocation model 48c provides a "moderate" investment profile with eighteen percent (18%) of assets invested in intermediate term bonds (IB), ten percent (10%) of assets invested in international bonds (IntB), and twenty percent (20%) of assets invested in large value equities (LV). The remaining fifty two percent (52%) of the asset allocation model 48c includes an essentially balanced mixture of small, medium, and large growth and value equities with exposure to growth equities (SG, MG, LG) and international equities (IntE) hedged by medium and small value equities (MV, SV) and by short term domestic bonds (STB). Thus, on the first subscriber's 31st birthday, the first subscriber's assets will be balanced according to the asset allocation model 48c. The first subscriber's assets will be invested according to the asset allocation model 48c until the trigger event 50b corresponding to the first subscriber's 41st birthday, when the assets will be rebalanced according to the asset allocation model 48d indicated by predetermined investment allocation path 44a. The first subscriber's assets then will remain invested according to the asset allocation model 48d until the trigger event 50d corresponding to the first subscriber's 61st birthday, when the first subscriber's assets will be rebalanced according to the asset allocation model 48e indicated by the predetermined investment allocation path 44a at the trigger event 50d. Thus, the first subscriber's assets will be rebalanced according to predetermined asset allocation models along the predetermined path 44a.

As a further example, the data 49 indicative of the risk tolerance 52 associated with a second subscriber may indicate a moderate value of the risk tolerance 52. Accordingly, at the step 54, the computerized method 40 would select the predetermined path 44e for the second subscriber's assets, as shown in FIGS. 3 and 4. At the trigger event 50a corresponding to the second subscriber's 31st birthday, the predetermined path 44e would indicate the asset allocation model 48b. The asset allocation model 48b provides a "moderate aggressive" investment profile having twenty one percent (21%) of assets invested in small value equities (SV), fourteen percent (14%) of assets invested in international equities (IntE), twelve percent (12%) of assets invested in large value equities (LV), twelve percent (12%) of assets invested in small growth equities (SG), and the remainder of assets invested in a mixture of bonds and equities. The second subscriber's assets will be rebalanced, at the trigger events corresponding to the second subscriber's 41st, 61st, and 65th birthdays, according to the corresponding asset allocation models along the predetermined path 44e.

Although specific percentages are described for each of the exemplary asset allocation models, the scope of the present invention is not limited to the asset allocation models as described.

Figure 6:
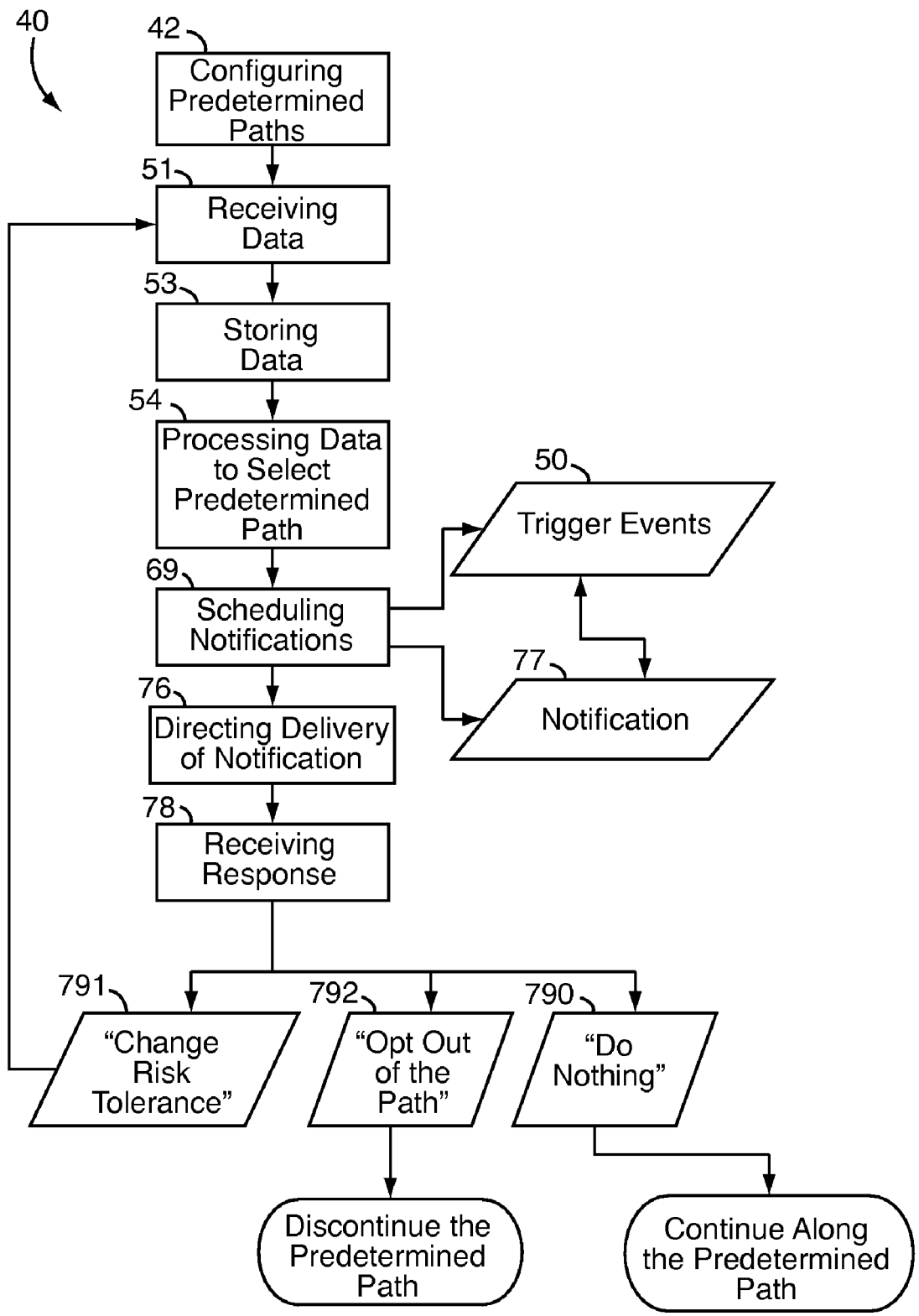
FIG. 6 is a flow chart of the computerized method of FIG. 3, further comprising steps for delivering a notification to the subscriber, in accordance with another embodiment of the present invention.

Referring to FIG. 6, in an embodiment of the present invention, the computerized method 40 may further include a step 69 of scheduling a notification 77 to be delivered to the subscriber before each of the plurality of trigger events 50a-50e. The server 12 may be configured to store the plurality of notifications 77 in the database 28 of the data storage device 22, or in the other computer-readable medium. The server 12 may also be configured to retrieve the trigger events 50a-50e and the notifications 77 from the database 28 or from the other computer-readable medium so as to perform a step 76 of directing delivery to the subscriber of the notification 77 corresponding to an upcoming trigger event 50. Each of the plurality of notifications 77 may include a description of a plurality of responses. Each of the notifications 77 may also include descriptions of the current risk tolerance 52, of the current asset allocation model, and of a subsequent asset allocation model, corresponding to the upcoming trigger event 50, selected from the predetermined path for the subscriber's assets.

For example, before the first subscriber's 41st birthday, the server 12 would perform a step 76 of directing delivery to the first subscriber of the notification 77 corresponding to the first subscriber's 41st birthday. The notification 77 would include a description of the first subscriber's risk tolerance 52 as "low", a description of the current asset allocation model 48c, and a description of the asset allocation model 48d, according to which the subscriber's assets would be rebalanced at the subscriber's 41st birthday.

As a further example, the step 76 could be performed in response to receipt of data 49 indicative of a possible change in the subscriber's risk tolerance 52. For example, the server 12 could be configured to monitor information related to market events, political events, or other news. In particular, the server 12 could monitor financial news information such as stock index valuations while also monitoring local news information such as engagement, birth, or wedding announcements as well as obituaries or foreclosure notices. Various means for monitoring such information sources are known in related fields of art. Additionally, the server 12 could monitor changes in the subscriber's payroll information, including benefits elections, or changes to the subscriber's tax withholding information, such as the subscriber's income, list of dependents, or marital status. On receipt of information potentially relevant to the subscriber's risk tolerance 52, the server 12 could perform the step 76. Potentially relevant information could be identified based on instructions previously provided by the subscriber, or based on rules extrapolated from the subscriber's age and other data 49 indicative of the subscriber's risk tolerance 52.

The computerized method 40 may further include a step 78 of receiving at the server 12 a response to the notification 77. The notification 77 could include a description of several possible responses: a "Do Nothing" response 790; an "Opt Out of the Path" response 792; and a "Change Risk Tolerance" response 791. If the server 12 does not receive a response at the step 78, or if the server 12 receives the "Do Nothing" response 790, then the computerized method 40 will continue according to the predetermined path selected for the subscriber's assets. Thus, the subscriber's assets will be rebalanced at the next trigger event according to the asset allocation model indicated by the predetermined path for the subscriber's assets.

If the server 12 at step 78 receives the "Opt Out of the Path" response 792, then the computerized method 40 will leave the subscriber's assets in the current asset allocation model, will discontinue rebalancing subscriber assets according to the predetermined path, and will direct all future contributions to the current asset allocation model. Thus, the subscriber's assets will remain in the current asset allocation model until the subscriber initiates a rebalancing or a transfer of assets out of the plan or account.

If the server 12 at step 78 receives the "Change Risk Tolerance" response 791, including updated values for the data 49 indicative of a new risk tolerance, then the step 54 will be performed to select an alternate predetermined path for the subscriber, based on the updated values of the data 49. For example, before the first subscriber's 41st birthday he or she might experience career advancement that would change the data 49 indicative of risk tolerance 52. Then, on delivery of the notification 77 at step 76, the first subscriber might provide the "Change Risk Tolerance" response 791, along with updated values for the data 49 indicative of a higher value of the risk tolerance 52. Accordingly, at the step 54, the computerized method 40 would select for the first subscriber an alternative predetermined path 44f, corresponding to the higher value of the risk tolerance 52, as shown in FIGS. 4 and 6. The selection of an alternative predetermined path, based on the "Change Risk Tolerance" response 791, would define a branch point for the first subscriber. Thus, the server would switch the subscriber's assets to the alternate predetermined path.

Subsequently, the server would direct investment of the subscriber's assets according to the alternate asset allocation models corresponding to the trigger events on the alternate predetermined path. This might result in a different asset allocation model becoming effective for the current trigger event, as well as for future trigger events. For the first subscriber, branching from the predetermined path 44c to alternate predetermined path 44f would result in the first subscriber's assets immediately being rebalanced to asset allocation model 48b. The first subscriber's assets then would proceed along the alternate predetermined path 44f, remaining in asset allocation model 48b until the trigger event 50c corresponding to the first subscriber's 51st birthday, and then being rebalanced to asset allocation model 48c.

A branch point also could occur at any other time, when the subscriber initiates selection of an alternate predetermined path by submitting new values of the data 49 indicative of a change to the risk tolerance 52. Similarly, the subscriber may "Opt Out of the Path" at any time.

Figures 7, 8:
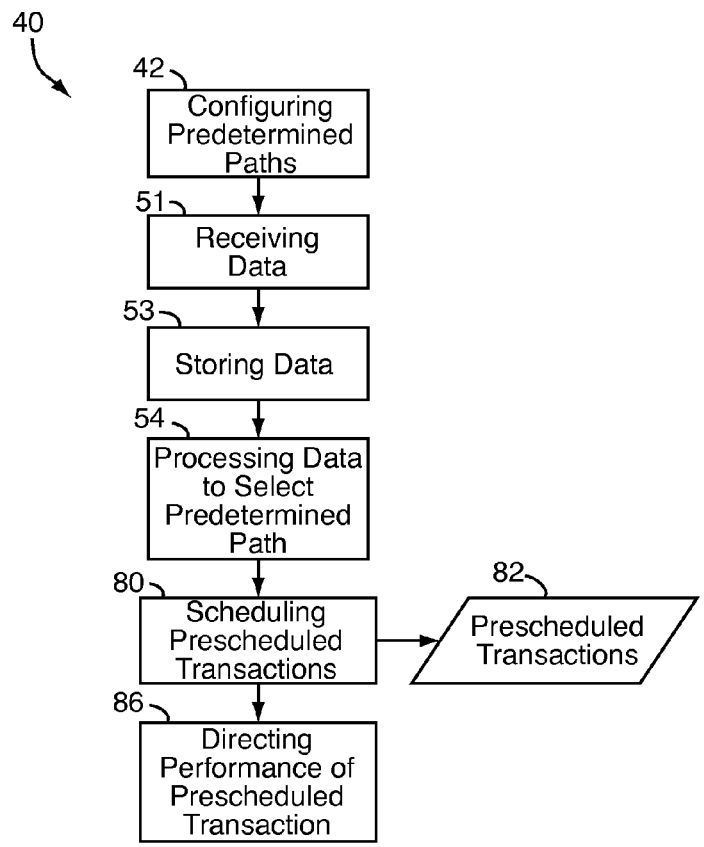
FIG. 7 is a flow chart of the computerized method of FIG. 3, further comprising steps for scheduling and performing pre-scheduled transactions, in accordance with another embodiment of the present invention.
FIG. 8 is a table of a custom predetermined path, as configured by the computerized method of FIG. 7 in accordance with an embodiment of the present invention.

Referring to FIG. 7, another embodiment of the computerized method 40 may also include a step 80 of scheduling a plurality of pre-scheduled transactions 82. The prescheduled transactions 82 may be scheduled by the server 12, and may be stored by the server 12 in the database 28 of the data storage device 22, or on the other computer-readable medium. The computerized method 40 also may include a step 86, preferably performed by the server 12, of directing performance of a pre-scheduled transaction selected from the plurality of pre-scheduled transactions 82.

The pre-scheduled transactions 82 could include various actions and events, including financial transactions, such as: increases or decreases of investment contributions; loan requests or loan payments; or asset withdrawals to fund major expenses. For example, the subscriber might know that they would have an increase in available assets at some future date (completion of a mortgage or car payment; end of college bills) and may want to pre-set an increase in their investment contributions. The subscriber could request a contribution increase for the future date, using an internet browser, a telephone call, a letter or an e-mail, or any other mode of communication. The subscriber would be notified of each pre-scheduled transaction before the scheduled date, and would be able to respond to the notification to change or opt-out of the transaction. Almost any type of transaction could be pre-scheduled in this manner. In addition to contribution increases or decreases, loan requests, rollovers, and transfers could all be pre-scheduled to meet a subscriber's future anticipated needs.

Pre-scheduled transactions could be used either in retirement plan accounts or in non-retirement plan accounts, such as individual annuities or life insurance. Transfers could be scheduled ahead within a variable annuity account, as could life insurance premium payments.

This capability would also be applicable to the predetermined investment allocation paths. The subscriber could use pre-scheduled transactions to adjust the risk tolerance so as to reconfigure the predetermined investment allocation paths and select an alternate predetermined path. Instead of configuring the predetermined investment allocation paths based on age and risk tolerance alone, a custom predetermined path could be developed, as shown in FIG. 8, based upon pre-scheduled transactions corresponding to anticipated life events. Marriage, major investments, children's births, and college bills could all have an impact on the financial needs of the subscriber, resulting in a desire to reallocate the retirement plan investment strategy. For example, if the subscriber knew that they would be buying a home in the near future, and expected to take a loan from their retirement plan to help fund the home purchase, the subscriber might want to pre-schedule a branch point so that their custom predetermined path indicates an asset allocation model with a less risky investment profile. Thus, the subscriber would be more likely to have access to the subscriber's assets for funding the loan. The subscriber might also want to pre-schedule a branch point after the intended loan request, so as to return the assets to an allocation model with a riskier investment profile.

Conversely, the subscriber might be willing to take on more risk after marrying, under the assumption that a larger retirement account would be needed, or because having two wage earners would support higher investment risk. In this scenario, the custom predetermined path could be designed to indicate a more aggressive asset allocation model following the anticipated wedding date. Another option would be to design a custom predetermined path where the risk tolerance increases with subscriber age, based on the assumption that the subscriber's salary also would increase with age.

One advantage of the present invention is that the predetermined investment allocation paths allow automatic rebalancing of the subscriber's assets in accordance with a set of asset allocation models at a pre-set number of trigger events. Such an automatic periodic rebalancing of assets alleviates the problem of a subscriber failing to appropriately shift his or her assets. The subscriber's assets will automatically be allocated according to a model appropriate to the subscriber's age and risk tolerance, so that assets are not exposed to undue risk of loss or left sitting to earn suboptimal returns.

Another advantage of the present invention is that it enables the subscriber to know, when he or she first enrolls his or her assets in the predetermined path, exactly how his or her assets will be allocated over time, based on the predetermined path selected.

A further advantage of the present invention is that it enables the subscriber to configure a custom predetermined path, taking into account anticipated life events and financial needs.

Another advantage of the present invention is that it notifies the subscriber of upcoming trigger events along the predetermined path, thereby allowing the subscriber to take various actions ahead of the trigger event.

Another advantage of the present invention is that it enables the subscriber to provide new data indicative of a change in his or her risk tolerance, thereby switching from the predetermined path to an alternate predetermined path at various branch points.

Another advantage of the present invention is that it enables the subscriber to pre-schedule transactions so that the subscriber's assets are made available for use at times of anticipated need, or are augmented during times of anticipated ease.

Although this invention has been shown and described with respect to the detailed embodiments thereof, it will be understood by those skilled in the art that various changes in form and detail thereof may be made without departing from the spirit and the scope of the invention. An example would be to store the data indicative of the subscriber risk tolerance not in the database, but in the other computer-readable medium. Another example would be to schedule trigger events or branch points not at subscriber birthdays, but as a function of time remaining until the subscriber's planned retirement date. A third example would be for the subscriber to design a custom predetermined investment allocation path, wherein the asset allocation models are arranged according to the subscriber's forecast of risk tolerance.

The present invention has been described with particular reference to a retirement investment account or plan, but the details of the present invention are equally applicable to the management of at least the following: "529" or higher education savings plans; variable annuities; variable life insurance plans or contracts; and/or retail brokerage accounts.

What is claimed is:

1. A computerized method for allocating financial assets related to a subscriber, the method comprising the steps of:
configuring, in a server, a plurality of predetermined investment allocation paths, each investment allocation path including a plurality of pre-selected trigger events, the trigger events comprising one or more of subscriber age or life events of the subscriber, and a plurality of asset allocation models, each of the plurality of asset allocation models having an investment profile corresponding to one of the plurality of pre-selected trigger events;

receiving data indicative of an initial risk tolerance associated with a subscriber;

storing the data in a database in communication with the server;

processing, in the server, the stored data to select one of said predetermined investment allocation paths corresponding to the initial risk tolerance, and responsive to receipt of data indicative of occurrence of one of the plurality of pre-selected trigger events, determining by the server data indicative of a rebalancing of the subscriber assets from one asset allocation model to another asset allocation model in accordance with the selected predetermined investment allocation path, and, based on information relevant to the subscriber's risk tolerance, receiving data indicative of a different risk tolerance associated with the subscriber, and selecting a different one of the predetermined investment allocation paths corresponding to the different risk tolerance.

2. The method according to claim 1, wherein the subscriber assets are invested in a retirement plan.

3. The method according to claim 1, further comprising a step of scheduling a pre-scheduled transaction.

4. The method according to claim 3, wherein the transaction is an increase of investment contribution.

5. The method according to claim 3, wherein the transaction is a decrease of investment contribution.

6. The method according to claim 1, further comprising a step of directing delivery to the subscriber of a notification preceding each of the plurality of trigger events, wherein the notification includes a description of an asset allocation model selected from the predetermined investment allocation path based on the corresponding trigger event.

7. The method according to claim 1, further comprising a step of directing delivery to the subscriber of a notification based on receipt of data indicative of a possible change in the subscriber's risk tolerance, wherein the notification includes a description of an asset allocation model selected from the predetermined investment allocation path based on a trigger event.

8. The method according to claim 6, wherein the notification includes a description of each of a plurality of potential responses.

9. The method according to claim 8, wherein the plurality of responses includes a change response, wherein an alternate predetermined path is selected, the alternate predetermined path having subscriber assets allocated according to alternate asset allocation models corresponding to the trigger events.

10. The method according to claim 8, wherein the plurality of subscriber responses includes a default response, wherein the subscriber assets are allocated according to the current predetermined path.

11. The method according to claim 1, wherein the trigger events comprise the subscriber's age.

12. The method according to claim 1, wherein the trigger events comprise the subscriber's life events.

13. The method of claim 1, wherein, responsive to receipt of data indicative of a subscriber instruction to switch from the selected predetermined investment allocation path to another of the plurality of investment allocation paths, providing by the server an output signal having data indicative of switching the subscriber between the plurality of predetermined investment allocation paths.

14. The method according to claim 13, wherein the branch point comprises a subscriber's life event.

15. The method according to claim 1, wherein configuring the plurality of predetermined investment allocation paths also includes receiving a subscriber list of custom trigger events.

16. The method according to claim 13 wherein the branch point is initiated by the subscriber.

17. The method according to claim 13, wherein the server switches the subscriber's assets to a different predetermined investment allocation path at the branch point.

18. The method according to claim 13, wherein the subscriber selects to switch assets to a different predetermined investment allocation path at the branch point.

19. A system for allocating subscriber assets comprising:

a data storage device for storing a subscriber's initial risk tolerance, a plurality of predetermined investment allocation paths, each of the predetermined investment allocation paths having a plurality of pre-selected trigger events, the trigger events comprising one or more of subscriber age or life events of the subscriber, and a plurality of asset allocation models, one of the plurality of asset allocation models corresponding to each of the pre-selected trigger events, and associations between a plurality of predetermined risk tolerances and the predetermined investment allocation paths; and a server coupled to the data storage device, wherein the server is configured to retrieve the subscriber's initial risk tolerance and to select one of the predetermined investment allocation paths based on the subscriber's initial risk tolerance, responsive to receipt of data indicative of occurrence of one of the pre-selected trigger events, change the asset allocation model to the asset allocation model corresponding, in accordance with the selected investment allocation path, to the received preselected trigger event, and, responsive to receipt of data, provided based on information relevant to the subscriber's risk tolerance, indicative of a different risk tolerance associated with the subscriber at a branch point, switch the subscriber to a different one of the plurality of predetermined investment allocation paths corresponding to the different risk tolerance.

20. The system according to claim 19, wherein the server is further configured to retrieve an asset allocation model based on the predetermined investment allocation path and a current trigger event.

21. The system according to claim 19, wherein the server is further configured to direct delivery to the subscriber of a notification preceding each of the plurality of trigger events, wherein the notification preceding each of the plurality of trigger events includes a description of an asset allocation model selected from the predetermined investment allocation path based on the corresponding trigger event.

22. The system according to claim 19, wherein the server is further configured to delivery to the subscriber of a notification based on receipt of data indicative of a possible change in the subscriber's risk tolerance, wherein the notification includes a description of an asset allocation model selected from the predetermined investment allocation path based on a trigger event.

23. The system according to claim 21, wherein the notification includes a description of each of a plurality of potential responses.

24. The system according to claim 23, wherein the plurality of responses includes a change response, wherein an alternate predetermined path is selected, the alternate predetermined path having subscriber assets allocated according to alternate asset allocation models corresponding to the trigger events.

25. The system according to claim 24, wherein the change response includes updated data indicative of a subsequent risk tolerance associated with the subscriber.

26. A non-transitory computer-readable medium on which has been recorded a computer program, which when executed by a server, performs a method for allocating financial assets related to a subscriber, the method comprising the steps of:
configuring, in a server, a plurality of predetermined investment allocation paths, each investment allocation path including a plurality of pre-selected trigger events, the trigger events comprising one or more of subscriber age or life events of the subscriber, and a plurality of asset allocation models, each of the plurality of asset allocation models having an investment profile corresponding to one of the plurality of pre-selected trigger events;
receiving data indicative of an initial risk tolerance associated with a subscriber;
storing the data in a database in communication with the server; and
processing the stored data to select one of the predetermined investment allocation paths corresponding to the initial risk tolerance,
responsive to receipt of data indicative of occurrence of one of the plurality of pre-selected trigger events, determining data indicative of a rebalancing of rebalancing of the subscriber assets from one asset allocation model to another asset allocation model in accordance with the selected predetermined investment allocation path, receiving, based on information relevant to the subscriber's risk tolerance, at a branch point, data indicative of a different risk tolerance associated with the subscriber, and providing an output signal having data indicative of switching the subscriber from the selected predetermined investment allocation path to another of the plurality of predetermined investment allocation paths corresponding to the different risk tolerance.

27. The computer-readable medium according to claim 26, wherein the computer program, when executed by the server, performs a method further comprising a step of scheduling a pre-scheduled transaction.

28. The computer-readable medium according to claim 26, wherein configuring a plurality of predetermined investment allocation paths also includes receiving a list of custom trigger events.

29. The computer-readable medium according to claim 26, wherein the computer program, when executed by the server, performs a method further comprising a step of directing delivery to the subscriber of a notification preceding each of the plurality of trigger events, wherein the notification preceding each of the plurality of trigger events includes a description of an asset allocation model selected from the predetermined investment allocation path based on the corresponding trigger event.

30. The computer-readable medium according to claim 26, wherein the computer program, when executed by the server, performs a method further comprising a step of directing delivery to the subscriber of a notification based on receipt of data indicative of a possible change in the subscriber's risk tolerance, wherein the notification includes a description of an asset allocation model selected from the predetermined investment allocation path based on a trigger event.

31. The computer-readable medium according to claim 29, wherein each of the plurality of subscriber notifications includes a description of each of a plurality of responses.

32. The computer-readable medium according to claim 30, wherein the plurality of responses includes a change response wherein the server receives updated data indicative of a subsequent risk tolerance associated with the subscriber.

33. The method of claim 11, wherein the trigger events of at least one of the investment allocation paths further comprise a plurality of pre-selected ages of the subscriber.

34. The method of claim 33, wherein the trigger events of the at least one of the investment allocation paths further comprise at least one life event of the subscriber.

35. The method of claim 33, wherein the trigger events of each of the investment allocation paths further comprise a plurality of pre-selected ages of the subscriber.

36. The system of claim 19, wherein the trigger events of at least one of the investment allocation paths comprise a plurality of pre-selected ages of the subscriber.

37. The system of claim 36, wherein the trigger events of the at least one of the investment allocation paths further comprise at least one life event of the subscriber.

38. The system of claim 37, wherein the life event comprises retirement of the subscriber.

39. The method according to claim 13, wherein the branch point comprises the subscriber's age.

40. The computerized method of claim 1, wherein the information relevant to the subscriber's risk tolerance comprises the age of the subscriber.

41. The system of claim 19, wherein the information relevant to the subscriber's risk tolerance comprises a trigger event.

42. The system of claim 19, wherein the information relevant to the subscriber's risk tolerance comprises the subscriber's age.

43. The system of claim 19, wherein the information relevant to the subscriber's risk tolerance comprises one or more of changes in the subscriber's marital status, list of dependents or income.

44. The computer-readable medium according to claim 26, wherein the information relevant to the subscriber's risk tolerance comprises an age of the subscriber.

* * * * *